June 19, 1928.
L. G. JOHNSON
SAFETY CONTROL APPARATUS FOR AIR BRAKES
Filed Sept. 11, 1926
1,674,249
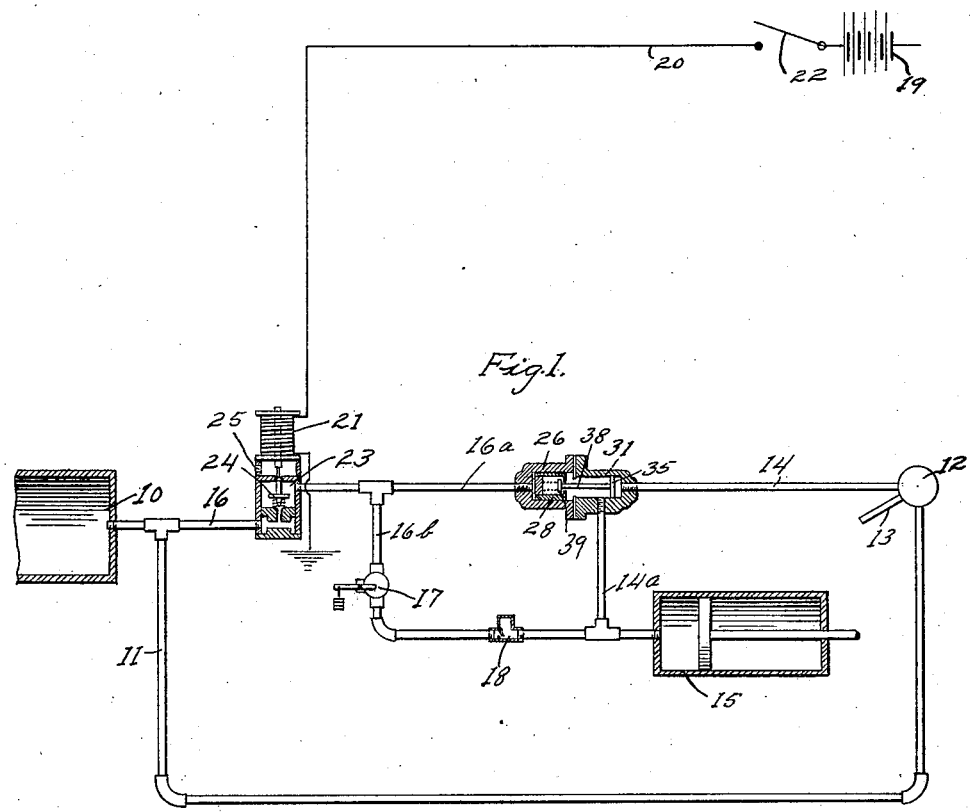
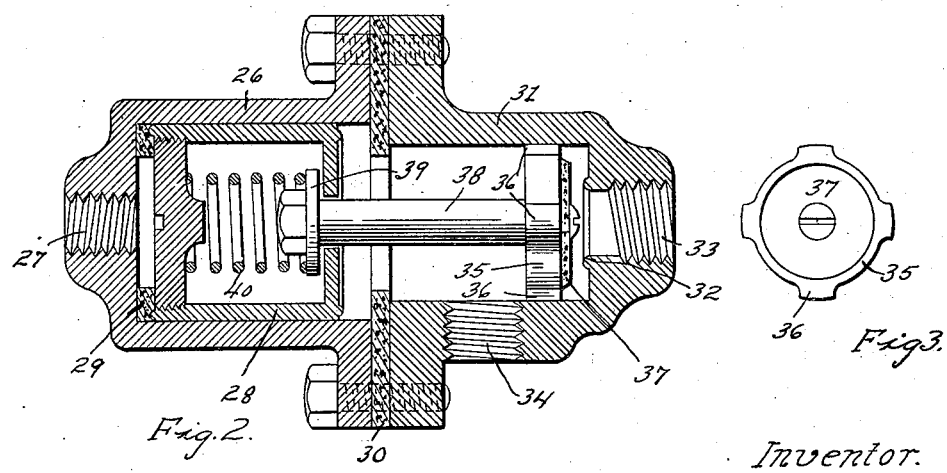
Inventor.
Lars G. Johnson
by Orwig & Hague Attys.

Patented June 19, 1928.

1,674,249

UNITED STATES PATENT OFFICE.

LARS G. JOHNSON, OF DES MOINES, IOWA.

SAFETY CONTROL APPARATUS FOR AIR BRAKES.

Application filed September 11, 1926. Serial No. 134,848.

My invention relates to that class of brakes operated by compressed air or other fluid and commonly employed for operating the brakes of vehicles such as street cars.

The object of my invention is to provide a safety control device of simple, durable and inexpensive construction whereby the brakes will be automatically maintained in a set condition so long as any electric switch at a car door or other device within the car is open, to thereby prevent the car from starting until the electric switches at the doors and so forth throughout the car are closed, and further to accomplish this desirable result without in any way interfering with the setting of the brakes by the ordinary motorman's control valve or the increase of the pressure in the brakes by the same means at any time.

A further object is to accomplish the foregoing desirable results with a minimum waste of compressed air and in a convenient facile and economical manner.

My invention consists in the construction, arrangement and combination of the various parts of the safety control valve, and the arrangement and combination thereof with the other parts of the apparatus, whereby the objects contemplated are attained, as hereinafter more fully set forth, pointed out in my claims, and illustrated in the accompanying drawings, in which:

Figure 1 shows a diagrammatical illustration of a safety control apparatus embodying my invention.

Figure 2 shows an enlarged, detailed, longitudinal, sectional view of the safety control valve; and Figure 3 shows an end elevation of the small valve head within the safety control valve.

Referring to the accompanying drawings, I have used the reference numeral 10 to indicate the main reservoir for compressed air or other fluid supplied by a suitable pump or in any ordinary manner. Leading from the main reservoir is an air pipe 11 extended to and communicating with the motorman's valve 12. This is an ordinary three-way valve of the kind commonly employed in connection with air brakes for street cars, and has an exhaust 13 leading from it and a pipe 14 communicating with it and leading indirectly to the brake cylinder which is indicated by the numeral 15, and which is of ordinary construction.

Communicating with the supply pipe 11 is a pipe 16 communicating indirectly with the brake cylinder 15 and designed for the purpose of operating the brake cylinder through the magnetic valve hereinafter described. This pipe 16 has two branches $16^a$ and $16^b$. The former leads to the safety control valve hereinafter described and the latter communicates with a pressure reducing valve 17 which communicates with a check valve, 18, which latter communicates with the brake cylinder 15.

The reference numeral 19 indicates a source of electric supply which may be a connection to a trolly wire. A conductor 20 leads from the battery 19 to the coil 21 of a magnetic valve. Interposed in this conductor 20 is a switch 22 and said parts are so arranged that when the switch is closed the magnetic coil will be energized. In practice a number of switches is provided, one for each door and one for the so-called dead man's button and other devices now commonly used in apparatus of this character.

The magnetic valve to which the magnetic coil is connected comprises a valve body 23 and a spring opened valve 24. The pipe 16 communicates with the lower portion of the valve casing 23 and a pipe $16^a$ communicates with the opposite side thereof. When the valve 24 is closed, air in the pipe $16^a$ may exhaust through the opening 25 above the valve 24. This valve is so arranged that when the magnetic coil is energized, the valve 24 will be pushed down against the pressure of the spring upon the valve seat, thus closing the passageway from the main reservoir 10 through the pipe 16, but when the switch 22 is open, then the spring of the valve 24 will elevate above its seat and close the exhaust 25 and permit the passage of air from the pipe 16 to the pipe $16^a$.

My improved safety control valve comprises a valve casing consisting of a large cylinder 26 at one end, having an opening 27 to receive the pipe $16^a$. Slidingly mounted within this cylinder 26 is a piston 28 capable of sliding movement within the cylinder and designed to be seated against a gasket 29 at the end adjacent to the pipe $16^a$ or against a gasket 30 at the opposite end. Secured to the cylinder 26 is a second smaller cylinder 31 having a valve seat 32 at its end opposite from the piston 28 and also having an opening 33 extending through the valve seat 32, and another opening 34 extending outwardly from the central portion of the cylinder 31 and designed to communicate by means of a branch pipe 14ª with the brake cylinder 15. Mounted within the cylinder 31 is a valve head 35 having outwardly extended lugs 36 to engage the interior of the cylinder 31 so that air may pass around the valve head through the cylinder 31. On the outer face of the valve head 31 is a gasket 37 designed to engage the valve seat 32 and thus close the passageway through the pipe 14. This valve head 35 is fixed to a valve stem 38 which is slidably extended through the piston 28 and has a head 39 within the piston 28. An expansible coil spring 40 is placed within the piston 38 to engage the head 39.

In practical operation, and assuming that the safety control valve is in the position shown in the drawings, then obviously compressed air may be passed through the motorman's valve through the pipe 14 into the cylinder 31 and around the valve head 35 and through the pipe 14ª to the brake cylinder, so that the motorman may have the ordinary control of the air brakes for all ordinary purposes. In the event, however, that the switch 22 is open, then the magnetic valve will be in position to permit the flow of air through the pipe 16, some of which will pass through the pipe 16ᵇ, the pressure reducing valve 17 and the check valve 18 into the brake cylinder to thereby maintain the brakes in set condition. At the same time some of the air will pass through the magnetic valve and through the pipe 16ª into the cylinder 26, which will have the effect of moving the piston 28 against the gasket 30, thereby applying a tension to the spring 40 tending to move the valve head 35 against the seat 32. When the valve is in this position there will be approximately the total pressure of the main reservoir upon the end of the piston 28 through the pipe 16ª, but the pressure upon the opposite end of the cylinder 28 through the pipe 14ª will be materially less on account of the pressure reducing valve 17, and it is intended that this pressure applied to the brake cylinder through the magnetic valve shall be only such amount as is ordinarily needed to hold the car stationary after it has been stopped, thus effecting a considerable economy in the use of compressed air as compared with such devices as apply the full main reservoir pressure to the brake cylinder when controlled by a magnetic valve.

In the event, however, that when the air is being applied to the brake cylinder in the manner just described it should develop that the air pressure was not sufficient to hold the car, say for instance on a steep incline, then the motorman may, by manipulating his valve 12, supply sufficient air pressure through the pipe 14 to move the valve head 35 away from the valve seat 32 by simply compressing the spring 40, and to thereby permit compressed air to pass from the pipe 14 through the pipe 14ª to the brake cylinder, and this is done obviously without changing the position of the valve 28. Hence during all the time the magnetic valve is open, there is automatically maintained in the brake cylinder a sufficient amount of compressed air to hold the car stationary under ordinary circumstances, but at the same time the motorman may supply any additional amount of compressed air to the brake cylinder as may in his opinion be necessary.

When the switch 22 is closed, then the valve 24 is moved downwardly against its spring by the magnetic coil, thus closing the passage through the pipe 16, but at the same time opening a passageway form the pipe 16ª through the exhaust 25. When the vent of the magnetic valve is open, as just described, then the compressed air within the pipes 16ª and 16ᵇ may exhaust, and as soon as this is done the compressed air in the brake cylinder will pass through the pipe 14ª to the interior of the cylinder 31, and this will cause the piston 28 to move into engagement with the gasket 29, thus forcing the valve head 37 away from its seat 32 and permitting the brake cylinder to exhaust through the pipe 14 to the exhaust 13 of the motorman's valve.

In practical operation I have demonstrated that when the switch 22 is open, or when a door or dead man's button or the like, represented by the switch 22, is open, then the magnetic valve, being non-energized will permit its spring to open the valve 24, thus moving the piston 28 to position for bringing the valve head 37 against its seat 32. These parts are so arranged that the valve head 35 will be seated before the piston 28 is seated upon the gasket 39, and during the last portion of the movement of the piston 28 the spring 40 will be compressed. When the parts are in this position, air will be built up within the brake cylinder through the pressure reducing valve to that degree of pressure for which the pressure reducing valve had been previously adjusted. During all of this time that the switch 22 is open, the motorman can place the maximum air pressure within the apparatus into the brake cylinder without effecting the safety control valve. This may readily be done because when a relatively high pressure is applied through the pipe 14 against the end of the valve head 35, it will overcome the lesser pressure within the cylinder 31 and compress the spring 40. When, however, the pressures in the pipes 14 and 14ª are balanced, the coil spring 40 will move the valve head 35 back against the seat 32.

My entire apparatus is obviously of very simple and inexpensive construction, and yet through the safety control an amount of compressed air just sufficient to maintain the car in a standing position on the track is maintained within the brake cylinder at all times when the switch 22 is open. During this time, through the operation of the motorman's valve, any great amount of pressure may be placed in the brake cylinder, but under ordinary circumstances the car may be maintained in its standing position by a relatively small amount of compressed air applied to the brake cylinder through the magnetic valve, and as soon as the magnetic valve is energized by closing the switch 22, the air within the pipes 16ª and 16ᵇ is promptly exhausted through the magnetic valve and the air within the brake cylinder is promptly exhausted through the motorman's exhaust valve and the car is in position to be started.

I claim as my invention:

1. In an apparatus of the class described, a safety control valve comprising a valve body formed with a cylinder at one end and with an air inlet pipe adjacent to the outer end of the cylinder, and also formed with a chamber at the other end communicating with the cylinder and with an air inlet opening at the outer end of said chamber, said valve body being also formed with an air inlet opening into said chamber spaced apart from the air inlet opening at the end thereof, a piston slidingly mounted in the cylinder and designed to close the air inlet opening into the cylinder when the piston is adjacent to said air inlet opening, a valve stem connected with the piston, a valve head on the valve stem arranged to stand between the two air inlet openings into said chamber when the piston is in its position adjacent to the outer end of the cylinder, said valve head being shaped to freely permit the passage of air from one of the air inlet openings to the other through said chamber when the valve head is spaced apart from the adjacent end of the chamber, and said valve head being also so arranged that when the piston is moved toward the center of the valve body, the said valve head will close the air inlet opening into the said chamber, and so long as there is an air pressure on the outer end of the cylinder the valve head will be held in its closed position, but when a greater air pressure is applied to the outer end of the valve head it will be moved inwardly toward the center of the valve body and permit the passage of air around the valve head and out through the intermediate opening, and when the air pressure upon the outer end of the piston is relieved the air pressure through the intermediate opening will return the piston to its seat adjacent to the outer end of the valve body and move the valve head to is intermediate position between the air inlet openings leading to the chamber in which the valve head is contained so that air may pass from said intermediate opening outwardly through the opening at the end of said chamber.

2. In an apparatus of the class described, a safety control valve comprising a valve body formed with a cylinder at one end and with an air inlet pipe adjacent to the outer end of the cylinder, and also formed with a chamber at the other end communicating with the cylinder and with an air inlet opening at the outer end of said chamber, said valve body being also formed with an air inlet opening into said chamber spaced apart from the air inlet opening at the end thereof, a piston slidingly mounted in the cylinder and designed to close the air inlet opening into the cylinder when the piston is adjacent to said air inlet opening, a valve stem connected with the piston, a valve head on the valve stem arranged to stand between the two air inlet openings into said chamber when the piston is in its position adjacent to the outer end of the cylinder, said valve head being shaped to freely permit the passage of air from one of the air inlet openings to the other through said chamber when the valve head is spaced apart from the adjacent end of the chamber, and said valve head being also so arranged that when the piston is moved toward the center of the valve body, the said valve head will close the air inlet opening into the said chamber, and so long as there is an air pressure on the outer end of the cylinder the valve head will be held in its closed position, but when a greater air pressure is applied to the outer end of the valve head it will be moved inwardly toward the center of the valve body and permit the passage of air around the valve head and out through the intermediate opening, and when the air pressure upon the outer end of the piston is relieved the air pressure through the intermediate opening will return the piston to its seat adjacent to the outer end of the valve body and move the valve head to its intermediate position between the air inlet openings leading to the chamber in which the valve head is contained so that air may pass from said intermediate opening outwardly through the opening at the end of said chamber, said valve stem being slidingly connected with the piston and a spring interposed between the valve stem and the piston, for the purposes stated.

3. In an apparatus of the class described, a safety control valve comprising a valve body formed with a cylinder at one end and with an air inlet pipe adjacent to the outer end of the cylinder, and also formed with a chamber at the other end communicating with the cylinder and with an air inlet opening at the outer end of said chamber, said valve body being also formed with an air inlet opening into said chamber spaced apart from the air inlet opening at the end thereof, a piston slidingly mounted in the cylinder and designed to close the air inlet opening into the cylinder when the piston is adjacent to said air inlet opening, a valve stem connected with the piston, a valve head on the valve stem arranged to stand between the two air inlet openings into said chamber when the piston is in its position adjacent to the outer end of the cylinder, said valve head being shaped to freely permit the passage of air from one of the air inlet openings to the other through said chamber when the valve head is spaced apart from the adjacent end of the chamber, said valve head being also so arranged that when the piston is moved toward the center of the valve body, the said valve head will close the air inlet opening into the said chamber, and so long as there is an air pressure on the outer end of the cylinder the valve head will be held in its closed position, but when a greater air pressure is applied to the outer end of the valve head it will be moved inwardly toward the center of the valve body and permit the passage of air around the valve head and out through the intermediate opening, and when the air pressure upon the outer end of the piston is relieved the air pressure through the intermediate opening will return the piston to its seat adjacent to the outer end of the valve body and move the valve head to its intermediate position between the air inlet openings leading to the chamber in which the valve head is contained so that air may pass from said intermediate opening outwardly through the opening at the end of said chamber, the diameter of the piston being substantially greater than the diameter of the valve seat on the valve head, for the purposes stated.

4. In an apparatus of the class described, a safety control valve comprising a valve body formed with a cylinder at one end and with an air inlet pipe adjacent to the outer end of the cylinder, and also formed with a chamber at the other end communicating with the cylinder and with an air inlet opening at the outer end of said chamber, said valve body being also formed with an air inlet opening into said chamber spaced apart from the air inlet opening at the end thereof, a piston slidingly mounted in the cylinder and designed to close the air inlet opening into the cylinder when the piston is adjacent to said air inlet opening, a valve stem connected with the piston, a valve head on the valve stem arranged to stand between the two air inlet openings into said chamber when the piston is in its position adjacent to the outer end of the cylinder, said valve head being shaped to freely permit the passage of air from one of the air inlet openings to the other through said chamber when the valve head is spaced apart from the adjacent end of the chamber, and said valve head being also so arranged that when the piston is moved toward the center of the valve body, the said valve head will close the air inlet opening into the said chamber, and so long as there is an air pressure on the outer end of the cylinder the valve head will be held in its closed position, but when a greater air pressure is applied to the outer end of the valve head it will be moved inwardly toward the center of the valve body and permit the passage of air around the valve head and out through the intermediate opening, and when the air pressure upon the outer end of the piston is relieved the air pressure through the intermediate opening will return the piston to its seat adjacent to the outer end of the valve body and move the valve head to its intermediate position between the air inlet openings leading to the chamber in which the valve head is contained so that air may pass from said intermediate opening outwardly through the opening at the end of said chamber, a reservoir for compressed air, a pipe leading from said reservoir to the opening in the cylinder of the safety control valve, a motorman's valve, a pipe communicating between the reservoir and the pipe leading from the motorman's valve to the end of the safety control valve adjacent to the valve head therein, a brake cylinder, a pipe communicating with the brake cylinder and with the intermediate air inlet of the safety control valve, an electrically controlled valve in the pipe between the reservoir and the safety control valve arranged to permit the passage of air through it when it is electrically energized and to automatically stop the passage of air through it when the current is shut off and to permit the escape of air from the portion of the pipe adjacent to the safety control valve, a pipe communicating with the pipe between the electrically controlled valve and the safety control valve and leading to the brake cylinder, and a pressure reducing valve and a check valve therein, substantially as and for the purposes stated.

5. In an apparatus of the class described, a safety control valve comprising a valve body formed with a cylinder at one end and with an air inlet pipe adjacent to the outer end of the cylinder, and also formed with a chamber at the other end communicating with the cylinder and with an air inlet opening at the outer end of said chamber, said valve body being also formed with an air inlet opening into said chamber spaced apart from the air inlet opening at the end thereof, a piston slidingly mounted in the cylinder and designed to close the air inlet opening into the cylinder when the piston is adjacent to said air inlet opening, a valve stem connected with the piston, a valve head on the valve stem arranged to stand between the two air inlet openings into said chamber when the piston is in its position adjacent to the outer end of the cylinder, said valve head being shaped to freely permit the passage of air from one of the air inlet openings to the other through said chamber when the valve head is spaced apart from the adjacent end of the chamber, and said valve head being also so arranged that when the piston is moved toward the center of the valve body, the said valve head will close the air inlet opening into the said chamber, and so long as there is an air pressure on the outer end of the cylinder the valve head will be held in its closed position, but when a greater air pressure is applied to the outer end of the valve head it will be moved inwardly toward the center of the valve body and permit the passage of air around the valve head and out through the intermediate opening, and when the air pressure upon the outer end of the piston is relieved the air pressure through the intermediate opening will return the piston to its seat adjacent to the outer end of the valve body and move the valve head to its intermediate position between the air inlet openings leading to the chamber in which the valve head is contained so that air may pass from said intermediate opening outwardly through the opening at the end of said chamber, a reservoir for compressed air, a pipe leading from said reservoir to the opening in the cylinder of the safety control valve, a motorman's valve, a pipe communicating between the reservoir and the pipe leading from the motorman's valve to the end of the safety control valve adjacent to the valve head therein, a brake cylinder, a pipe communicating with the brake cylinder and with the intermediate air inlet of the safety control valve, an electrically controlled valve in the pipe between the reservoir and the safety control valve arranged to permit the passage of air through it when it is eletrically energized and to automatically stop the passage of air through it when the current is shut off and to permit the escape of air from the portion of the pipe adjacent to the safety control valve, a pipe communicating with the pipe between the electrically controlled valve and the safety control valve and leading to the brake cylinder, and a pressure reducing valve therein, substantially as and for the purposes stated.

Des Moines, Iowa, September 3, 1926.

LARS G. JOHNSON.